UNITED STATES PATENT OFFICE 2,387,723

MANUFACTURE OF ORGANIC COMPOUNDS

Henry Dreyfus, London, England, assignor to Celanese Corporation of America, a corporation of Delaware No Drawing. Application March 25, 1941, Serial No. 385,203. In Great Britain April 3, 1940

4 Claims. (Cl. 260—680)

This invention relates to the manufacture of organic compounds, and more particularly compounds containing two reactive groups.

Dihalogenated paraffins containing 4 or more carbon atoms, and especially alpha-omega-halogenated paraffins, are of great value in the manufacture of high molecular polymers by reason of the fact that they can be transformed by simple chemical reactions into such substances as organic di-acids and diamines. The present invention is concerned with the production of di-halogenated paraffins from relatively cheap starting materials and the use of these di-halogenated paraffins for the production of organic di-acids, diamines and related compounds.

According to the present invention dihalogenated paraffins are produced by subjecting a halogen derivative of an olefine to a process involving condensation under the action of heat in presence of a reactive metal, so as to eliminate halogen from the compound by formation of a metal halide, and reaction with a hydrogen halide.

It is preferred in carrying out the process of the invention to employ chlorine compounds, and most important embodiment of the invention comprises the production of dichlorhexane from allyl chloride. The invention includes also the production from the dichlorhexane, and likewise from other dihalogenated paraffins formed by the process indicated, of disulphonic acids, dicarboxylic acids, diamines and related compounds such as amino-sulphonic acids.

The condensation step can be carried out with a variety of metals including alkali metals, alkaline earth metals, magnesium and silver, but it is preferred to use copper which is best employed in a state of very fine subdivision. A chemical method may be used to produce the metal in any desired state of subdivision, e. g. copper may be prepared by adding zinc dust to a copper sulphate solution. Alternatively, the metal may be prepared by precipitation of a colloidal solution thereof or a mechanical method of disintegrating the metal may be used, although this latter method gives a less satisfactory product with copper.

In practice it has been found best to use copper or silver as the reactive metal this copper or silver being prepared by reduction with sulphur dioxide of an ammoniacal solution of a copper or silver salt which has been acidified with a lower fatty acid. The lower fatty acid used may, for example, be formic acid, acetic acid or propionic acid and acetic acid is most readily available and gives excellent results. It is best to use relatively dilute solutions, for instance, the ammoniacal solution may be prepared by adding aqueous ammonia of .880 sp. gr. to a copper salt or silver salt solution of less than 20% concentration and preferably of a concentration of 5-10%. Acidification of such a solution with acetic acid produces a clear solution of deep blue colour in the case of copper salts and a white precipitate in the case of silver salts. The solution, or suspended precipitate, on reduction with sulphur dioxide produces the desired metal in a very reactive form which can be used after washing with water and while still moist or after drying by treatment with alcohol and ether. The metal should be stored out of contact with air to avoid oxidation.

When starting with allyl chloride the condensation step may be effected by bringing the allyl chloride in vapor form into contact with finely divided copper suspended in an organic diluent and maintained at a temperature of about 100° C. or higher, e. g. 130-180° C. Alternatively, a mixture of allyl chloride and diluent may first be prepared and the finely divided copper then added, the mixture being kept agitated while it is heated to the reaction temperature and maintained thereat for the requisite period. The hexa-diene obtained in the manner described above may be subjected to reaction with hydrogen chloride to obtain 1.6 dichlornexane. Alternatively, however, the allyl chloride may be first subjected to reaction with hydrogen chloride to produce 1:3-dichlorpropane and this compound then subjected to condensation to form 1:6 dichlorhexane by means of copper or other reactive metal in the manner described with reference to allyl chloride. In either case the reaction with hydrogen chloride is one of simple addition which can be carried out by heating together concentrated hydrochloric acid and the hydrocarbon in an autoclave or by passing a mixture of the hydrocarbon vapour and gaseous hydrogen chloride through a heated reaction zone which may, if desired, contain a material having a high surface development, for instance silica gel. When this latter method of effecting the reaction with hydrogen chloride is employed a temperature little above the boiling point of the chlorinated hydrocarbon used is suitable for the reaction.

The chlorinated hydrocarbons obtained by the process described can be converted into disulphonic acids very simply, for instance by reaction with a salt of sulphurous acid and especially an alkali sulphite, e. g. a sodium or ammonium sulphite. This process, which is described more particularly in connection with the production of butane-1:4-disulphonic acid from 1:4-dichlor-butane in my U. S. application S. No. 378,655 filed February 12, 1941, is one which can be carried out very satisfactorily with an acid sulphite, e. g. sodium bisulphite, since such acid sulphites lead to the production of the free acid, whereas a normal sulphite produces only the corresponding salt of the sulphonic acid.

The reaction between the halogenated hydrocarbon and the sulphite can be carried out by heating a mixture of the halogenated hydrocarbon with an aqueous solution of the sulphite to a temperature which should be above 80° C. and can very conveniently be the boiling point of the aqueous solution. It is preferred to heat the sulphite solution to the reaction temperature and then add the chlorinated hydrocarbon slowly while maintaining the heating of the mixture under reflux until the reaction has proceeded to the desired degree. If desired the reaction can be speeded up by heating the mixture of reactants under superatmospheric pressure, e. g. by heating them in an autoclave to a temperature of 150–200° C.

It is preferred to employ somewhat more of the sulphite than is theoretically required to react with the whole of the chlorinated hydrocarbon present or to be added during the process. Thus, while theoretically each molecule of dichlorhexane requires two molecules of sulphite for the production of the disulphonic acid, it is preferred in carrying out the processes of the present invention to have present about 2.5 to 3 or even more, e. g. 4 or 5 molecules of sulphite. In this connection, it is to be noted that while the process has been described with reference to the use of a solution of the sulphite it is not essential that the whole of the sulphite employed should be dissolved. Indeed, in the case of sodium bisulphite, which as above indicated, is the preferred reagent, complete solution can only be effected by the use of an unduly large volume of water and in this case it is possible to employ a suspension of the bisulphite in a finely divided form in a saturated solution and in practice it is found that as the process proceeds and bisulphite is used up that which is suspended in turn dissolves and reacts with the chlorinated hydrocarbon.

Where a salt of a disulphonic acid is produced the free acid may be obtained by acidification of the salt solution with a strong acid and separation of the salt of this strong acid which is thus produced.

As an alternative to reacting the halogenated hydrocarbon with a sulphite it may be reacted with a cyanide, and especially a cyanide of an alkali or an alkaline earth metal, to produce either the nitrile of an omega-halogen aliphatic monocarboxylic acid or the dinitrile of a dicarboxylic acid. The reaction with a cyanide can best be carried out by heating together the halogenated hydrocarbon and a strong aqueous solution of the cyanide whilst maintaining the reactants in admixture by efficient stirring. The reaction takes place at temperatures in the neighbourhood of 100° C., e. g. at temperatures of 100–120° C., and can most conveniently be carried out at the boiling point of the aqueous cyanide solution. Thus, in practice, the process may consist simply in boiling a mixture of the halogenated hydrocarbon and a strong aqueous solution of sodium or calcium cyanide under reflux. Where it is desired to produce the nitrile of a halogen monocarboxylic acid, it is preferred to have present a considerable quantity of diluent, this diluent being, if desired, the medium in which the cyanide is dissolved, e. g. water, alcohol, or aqueous alcohol, and to have present only sufficient cyanide to react with the halogen it is desired to remove or even rather less than this.

The nitrile of a halogenated mono-carboxylic acid thus produced can be transformed into a sulpho-carboxylic acid, for instance by reaction with a sulphite in the manner already described with reference to the treatment of dihalogen hydrocarbons so as to produce the nitrile of an alpha-omega-sulpho-carboxylic acid, the sulpho-carboxylic acid itself being formed therefrom by subsequent or simultaneous hydrolysis. This operation is described more fully in my prior U. S. application S. No. 378,653 filed February 12, 1941, which also describes the production of sulphocarboxy compounds from halogen aliphatic nitriles, such as are produced by the process of the present invention, by forming an isothiourea and reacting this compound with a halogen, the sulpho-halide produced being hydrolysed to form a sulpho-carboxylic acid. This formation of an isothiourea and its subsequent reaction with a halogen to produce di-sulpho-chlorides and di-sulphonic acids may also be applied to 1.6-dichlorhexane and like compounds produced by the process of the present invention.

Where the nitrile of a sulphocarboxylic acid or a salt thereof is recovered as such it can, if desired, be subjected to reduction to produce an omega-amino sulphonic acid. Thus, hexane 1-nitrilo-6-sulphonic acid (produced, for instance, from 1.6 dichlorhexane via the 1-nitrilo-6-chlor compound) or sodium or other salts of this acid may be reduced to the omega-amino-hexane sulphonic acid. Where the reaction between the dihalogen hydrocarbon and a cyanide is conducted so as to produce a dinitrile, for instance where suberic dinitrile is produced from 1.6-dichlorhexane the corresponding dicarboxylic acid may be obtained by hydrolysis, e. g. by boiling with an aqueous mineral acid such as hydrochloric acid, or, alternatively, the corresponding diamine may be obtained by subjecting the dinitrile to reduction.

The reduction both of omega-nitrile sulphonic acids or their salts and alpha-omega-dinitriles may be effected by means of nascent hydrogen, produced, for instance with the aid of sodium or sodium amalgam or zinc and hydrochloric acid, and in this case the reaction takes place at ordinary temperatures. Alternatively, molecular hydrogen can be used in presence of a suitable catalyst, for instance hydrogen may be passed into a reaction medium comprising the compound to be reduced and containing finely divided nickel in suspension; in this case the reaction is best carried out at somewhat elevated temperatures, for instance temperatures of about 100° C. or higher, e. g. up to 130° C., and preferably the hydrogen is introduced under superatmospheric pressure. Vapour phase reduction, more particularly in the case of the dinitriles, can also be employed, the vaporous starting material being passed together with hydrogen through a heated reaction zone containing a hydrogenation catalyst such as finely divided nickel or reduced copper.

While, as previously indicated, the invention is of especial importance in connection with the utilisation of allyl chloride, the process of the invention may be applied also to other halogen derivatives of olefines, especially higher homologues of the allyl halides.

Having described my invention what I desire to secure by Letters Patent is:

1. Process for the manufacture of di-olefines which comprises heating a mono-chlorinated mono-olefine in which the chlorine atom is attached to a carbon atom other than those united by the double bond in the presence of a finely divided metal selected from the group consisting of copper and silver and obtained by reduction of a salt thereof in an aqueous medium.

2. Process for the manufacture of 1:5-hexadiene which comprises heating allyl chloride in the presence of a finely divided metal selected from the group consisting of copper and silver and obtained by reduction of a salt thereof in an aqueous medium.

3. Process for the manufacture of di-olefines which comprises heating a mono-chlorinated mono-olefine in which the chlorine atom is attached to a carbon atom other than those united by the double bond in the presence of a finely divided metal selected from the group consisting of silver and copper and obtained by acidifying an ammoniacal solution of a salt of the said metal by means of a lower fatty acid and reducing the product with sulphur dioxide.

4. Process for the manufacture of 1:5-hexadiene which comprises heating allyl chloride in the presence of a finely divided metal selected from the group consisting of silver and copper and obtained by acidifying an ammoniacal solution of a salt of the said metal by means of a lower fatty acid and reducing the product with sulphur dioxide.

HENRY DREYFUS.